3,034,997
PRINTING INK COMPRISING PROPANOL, POLY-
AMIDE AND TOLUENE-SULFONAMIDE FORM-
ALDEHYDE RESIN
Arthur J. Dunne, Rego Park, and Kenneth A. Bownes, Queens Village, N.Y., assignors to Interchemical Corporation, New York, N.Y., a corporation of Ohio
No Drawing. Filed Oct. 2, 1959, Ser. No. 843,952
4 Claims. (Cl. 260—15)

This invention relates to improvements in flexographic printing and in inks therefor. Flexographic printing is a letter-press process and is characterized by the fact that the ink is applied to the work by rotary rubber plates. Due to the great flexibility of this process, its low operating costs, and the extremely high press speeds, possible even when printing on troublesome stocks, it is widely used for printing on packaging materials such as cellophane, glassine, and polyethylene films.

Printing inks for these materials present special problems due to the thickness of the sheets which prevent them from clinging well to the inked form in some cases, and the non-absorbency of the printing surface which causes drying and adhesion problems. The ink used in printing on these materials must be rapid drying, display great fluidity and display adhesion to these materials upon drying. The surfaces of these materials are very difficult to print upon because normal types of inks adhere poorly to such smooth surfaces. Inks adhere better to rough surfaces where some mechanical interlocking is possible; consequently printing on cloth, felt, etc. presents no serious problem. With smooth surfaced materials such as cellophane, glassine and polyethylene, there is very little free surface energy available for interfacial reactions of the type required to bind a film of ink to the surface. The ink must be responsible for imparting sufficient free energy to the smooth surface to form an adequate adhesive bond, not only under wet conditions but when the ink is thoroughly dry and the print has aged. In addition, because a substantial portion of the packaging materials is used for foods which are kept under refrigeration the dried ink must adhere to the substrate even when exposed to water for several days.

The above problems have been overcome to a considerable extent in the past by the use of a varnish comprising a polyamide resin of the type described in Bradley Patent 2,379,413, for instance comprising the condensation product of ethylene diamine and a mixture of dilinoleic and trilinoleic acids in a solvent of a 1:1 mixture of an alcohol, usually n-propanol, and an aliphatic hydrocarbon having a boiling range in area of 250° F. to 290° F. Although inks containing the varnish displayed the excellent drying and adhesion properties required in flexographic printing on these smooth surfaced materials, these inks were less than desirable in other respects. Primary among these deficiencies was the reactivity of the 1:1 n-propanol/aliphatic hydrocarbon solvent with natural rubber plates and rollers normally used in flexographic printing. These rollers swelled and became disfigured. Synthetic rubber plates and rollers could be used but they were less effective than natural rubber. In addition, the inks remained slightly deficient in flow properties. Finally the polyamide resin was incompatible to a certain extent with nitrocellulose, a material which is conventionally considered to be very desirable in flexographic inks in that it improves flow properties, tack, pigment wetting properties and acts as a toughening agent.

There has now been discovered a new varnish which when mixed with pigment provides a flexographic ink which retains the excellent adhesion and drying properties of the above described polyamide inks while overcoming the deficiencies of said inks. These new inks are compatible with nitrocellulose and have improved flow properties. In addition, they include a varnish which requires little or no aliphatic hydrocarbon solvent, thus eliminating reactivity of the solvent with the natural rubber rollers and plates of the flexographic press. The resinous binders in these new inks are compatible with nitrocellulose to a considerable extent.

In addition, the inks of this invention display complete resistance to cocoanut oil and thus solve a problem which has been hampering the food packaging industry for many years. In the past printed cellophane, glassine and polyethylene films could not be used to package cocoanut oil food products such as candies, cakes and other confections because the cocoanut oil would react with the printed ink causing said ink to separate from the film.

The novel flexographic inks of this invention comprise pigment dispersed in a varnish comprising an alcohol solvent, especially n-propanol solvent, and a resinous binder which contains the condensation product of toluene sulfonamide and formaldehyde and a polyamide resin of the type described in Bradley Patent 2,379,413.

As has been previously stated, the resinous binders of this invention display improved compatibility with nitrocellulose. When preparing the varnish, 1 to 3 parts by weight of nitrocellulose are preferably blended with 4 parts of the resinous binder. The proportion of nitrocellulose is not critical. In fact the nitrocellulose may be eliminated completely with some downgrading of the flow properties, the tack and the pigment wetting properties of the varnish.

While a mixture comprising 25% trilinoleic acid and 75% dilinoleic acid preferably is used in preparing the polyamide, the proportions of these fatty acids are in no way meant to be critical. In fact, dilinoleic acid alone could be used and would be preferable if it were available in a commercial product because there would be greater solubility of the polyamide due to less crosslinking. The above mixture of trilinoleic and dilinoleic acids is commercially available at reasonable cost.

In preparing the resinous binder, it is preferred to use at least 9 parts by weight of the condensation product of ethylene diamine with the polymerized fatty acids for every 1 part of the toluene sulfonamide-formaldehyde condensation product.

The solvent for the inks of this invention is n-propanol. However, it has been found that the addition of small amounts of a hydrocarbon having a K.B. value of 33 to 34 and a boiling range of 237° F. to 290° F. will slightly enhance the flow properties of the ink without reacting with the natural rubber rollers and plates of the flexographic presses if the hydrocarbon solvent used does not exceed 10% of the total solvent weight.

The following examples will illustrate the practice of this invention:

Example 1

The following ingredients were mixed:

Parts by weight
Resin (the condensation product of toluene sulfonamide and formaldehyde) _____ 2
Binder (the condensation product of ethylene diamine and a commercial product comprising 1 part by weight of trilinoleic acid and 3 parts of dilinoleic acid) _____ 60
n-Propanol _____ 60

An ink was then prepared by mixing the above varnish in the following formulation:

| | Parts by weight |
|---|---|
| Above described varnish | 18.6 |
| Calcium lithol pigment | 11.6 |
| n-Propanol | 48.0 |
| Petroleum wax | 1.6 |
| Hydrogenated tallow acetamide | .5 |
| Ethyl acetate | 6.2 |
| Spirit soluble nitrocellulose | 7.0 |
| Ethanol | 6.6 |

Flexographic proofs were made using films of the resulting ink. The ink showed high gloss and good adhesion to cellophane and polyethylene films. The prints showed an excellent moisture resistance, being virtually unaffected after being immersed in an ice bath for 3 days. The ink remained fluid on standing, showing no signs of thioxtrophy or gelation. It also displayed excellent flow properties.

The nitrocellulose content of the ink was then varied. Nitrocellulose was compatible with the resin binder and provided inks having the above mentioned desirable properties when 1 to 3 parts by weight of nitrocellulose were used for every 4 parts of resin binder.

Cellophane film printed with this ink was tested for resistance of the ink to cocoanut oil. A piece of blotting paper saturated with cocoanut oil was placed over the printed film and retained in this position for 4 hours. It was then removed and the printed area was rubbed vigorously with a finger. The printed area remained unaffected.

*Example 2*

Example 1 was repeated using the following proportions:

| | Parts by weight |
|---|---|
| The condensation product of toluene sulfonamide and formaldehyde | 2.8 |
| The condensation product of ethylene diamine and a commercial product comprising 1 part by weight of trilinoleic acid and 3 parts of dilinoleic acid | 37.2 |
| n-Propanol | 60 |

An ink was then prepared by mixing the above varnish in accordance with the procedure and formulation described in Example 1. The inks displayed properties equivalent with the ink of Example 1 in all respects.

*Example 3*

Example 1 was repeated using the following proportions of ingredients:

| | Parts by weight |
|---|---|
| The condensation product of toluene sulfonamide and formaldehyde | 4 |
| The condensation product of ethylene diamine and a commercial product comprising 1 part by weight of trilinoleic acid and 3 parts of dilinoleic acid | 36 |
| n-Propanol | 60 |

An ink was then prepared by using the above varnish with the formulation and the procedure described in Example 1. It displayed better flow properties than the ink of Example 1. In all other proporties this ink was equivalent to the ink of Example 1.

*Example 4*

Eaxmple 1 was repeated with a mixture of 54 parts by weight of n-propanol and 6 parts by weight of an aliphatic hydrocarbon solvent having a boiling range of 247° F. to 290° F. and a K.B. value of 33.9.

An ink was prepared by using the above varnish in the ink formulation of Example 1, in accordance with the procedure of Example 1. This ink had slightly better flow properties than did the ink of Example 1.

Any of the pigments used in conventional flexographic inks may be used as pigments. The pigments described in the foregoing examples are merely given for illustration purposes and it is not intended to limit this invention to the use of the pigments described.

In the preparation of the varnish or vehicle, the proportions of the binder and the solvent are not considered to be critical. However, it is preferred to have the varnish consist of 40 to 60% by weight of binder and the remainder solvent.

While there have been described what are at present considered to be the preferred embodiments of this invention, it will be obvious to those skilled in the art that various changes and modifications may be made therein without departing from this invention, and it is, therefore, aimed to cover all such changes and modifications as fall within the true scope and spirit of this invention.

What is claimed is:

1. A flexographic printing ink comprising pigment dispersed in a varnish comprising a propanol solvent and a binder including nitrocellulose, the polyamide condensation product of ethylene diamine and dilinoleic acid, and the resinous condensation product of toluene sulfonamide and formaldehyde; the ratio by weight of the diamine-fatty acid condensation product with respect to the toluene sulfonamide-formaldehyde reaction product being at least 9:1.

2. The ink defined in claim 1, wherein said solvent further includes an aliphatic hydrocarbon solvent having a Kauri-butanol value of 33 to 34 and a boiling range of 247° F. to 290° F., said hydrocarbon solvent constituting 10% of the total solvent weight.

3. The ink defined in claim 1, wherein said polyamide condensation product further includes trilinoleic acid in the ratio of 1 part by weight of trilinoleic acid for every 3 parts of dilinoleic acid.

4. A flexographic printing ink comprising pigment dispersed in a varnish comprising a propanol solvent and a binder including the polyamide condensation product of ethylene diamine and dilinoleic acid, and the resinous condensation product of toluene sulfonamide and formaldehyde; the ratio by weight of the diamine-fatty acid condensation product with respect to the toluene sulfonamide-formaldehyde reaction product being at least 9:1.

References Cited in the file of this patent

UNITED STATES PATENTS

| 1,907,554 | Moss et al. | May 9, 1933 |
| 2,537,531 | Hoyt | Jan. 9, 1951 |
| 2,768,090 | Wittcoff et al. | Oct. 23, 1956 |
| 2,788,287 | Zweig | Apr. 9, 1957 |

OTHER REFERENCES

Floyd: "Polyamide Resins," published by Reinhold Publishing Corp., New York, 1958, pages 210–212.